(12) United States Patent
Mullen et al.

(10) Patent No.: US 6,264,871 B1
(45) Date of Patent: Jul. 24, 2001

(54) FIELD JOINT

(75) Inventors: Douglas Thomas Mullen, East Lothian; Iain Smith, Swindon, both of (GB)

(73) Assignee: Bredero Price Coaters Ltd. (GB)

( * ) Notice: Subject to any disclaimer, the term of this patent is extended or adjusted under 35 U.S.C. 154(b) by 0 days.

(21) Appl. No.: 09/231,518

(22) Filed: Jan. 14, 1999

(51) Int. Cl.[7] ............................... B29C 65/54; F16L 59/20
(52) U.S. Cl. .................. 264/263; 156/304.2; 156/304.5; 264/265; 285/47; 285/53
(58) Field of Search ...................... 264/135, 263, 264/265; 285/47, 48, 53; 156/304.1, 304.2, 304.5

(56) References Cited

U.S. PATENT DOCUMENTS

| | | | |
|---|---|---|---|
| 3,711,124 | * | 1/1973 | Gerholt et al. ...................... 285/47 |
| 3,731,710 | * | 5/1973 | Bauer et al. ......................... 285/47 |
| 4,019,761 | * | 4/1977 | Heidemann .......................... 285/47 |

FOREIGN PATENT DOCUMENTS

| | | | |
|---|---|---|---|
| 1767264 | 5/1958 | (DE) . | |
| 3822090 | 7/1989 | (DE) . | |
| 0030776 | 6/1981 | (EP) . | |
| 0038051 | 10/1981 | (EP) . | |
| 0360028 | 3/1990 | (EP) . | |
| 310515 | 10/1973 | (NL) . | |
| WO89/11618 | 11/1989 | (WO) . | |
| WO 94/29635 | * | 12/1994 | (WO) ................................. 285/53 |

* cited by examiner

*Primary Examiner*—Mathieu D. Vargot
(74) *Attorney, Agent, or Firm*—Lalos & Keegan

(57) ABSTRACT

The method of forming a field joint around the bare joint of two joined insulation covered pipes includes providing a first angular cut back in the coating to expose the end of a pipe and providing a second cut back in the coating to provide an annular band of the coating of a lesser diameter than the coating on the pipe. A thin coating of polyurethane may then be applied over the first and second cut backs and a recess provided in the band of coating. A mould may then be secured around the lesser diameter band, and polyurethane pumped into the mould in a sufficient amount to form a field joint which extends into the second cut back and lies flush with the coating of the pipes so as to allow for reeling and laying of the pipe without snagging. The field joint can be located around the bare joint and includes a polyurethane infill recessed into the insulated coating of the pipes such that infill lies flush with the surface of the coating on the pipes.

7 Claims, 2 Drawing Sheets

FIELD JOINT

This invention relates to a method of forming a field joint for insulated pipelines for use especially, but not exclusively, sub-sea and, more specifically, to a method of forming a field joint for insulated pipelines which facilitates smooth reeling and laying of the pipelines.

Pipes which are factory-coated with an elastomer or insulation coating can only be coated to within approximately 200 mm of the pipe ends as a section of the pipe end must be left bare to allow pipes to be joined together, normally by a welding process.

The pipes are normally welded together as an integral part of the pipe laying process. Where this is carried out off shore the pipe welding would generally take place on a lay barge or a reel ship on a continuous basis.

In order to minimise the rate of installation, it is necessary to be able to complete the coating of a welded field joint within the ten to fifteen minutes in which another field joint is being welded. In theory, the insulation at the field joint should meet a similar specification as that of the parent coating but using the process used for applying the parent coating to the body of the pipe would increase the production time by an unacceptable amount. The presently used solution to the problem of filling the field joint within the time taken for the welding process is to apply a sheet metal mould around the parent coating of the pipe, inject a quick setting insulation material such as polyurethane or polyolefin, allow it to set and remove the mould.

FIG. 1 of the drawings illustrates a typical field joint produced in accordance with this known method between two coated pipe sections A and B. Although the above method produces a satisfactory field joint C between the ends of two pipe sections, as the polyurethane filler overlaps the polypropylene coating D at the ends of the pipe, this reduces the reliability of the resulting pipeline. The coated pipe has to pass over a roller as it heads out-board of the lay barge or reeling ship and this often results in snagging of the field joint during both reeling and subsequent laying of the pipeline. This can damage both the field joint and also lead to damage to the rollers over a period of time due to the large number of field joints passing over the rollers during a pipe-line laying operation.

The present invention aims to provide an improved field joint which overcomes or at least mitigates the disadvantages suffered by the known field joints. The present invention also aims to provide a method for forming an improved field joint.

According to one aspect of the present invention there is provided a method of forming a field joint around the bare joint of two joined insulation covered pipes comprising the steps of providing a first angular cut back in the parent coating to expose the end of a pipe, providing a second cut back in the parent coating to provide an annular band of the parent coating of a lesser diameter than the parent coating on the pipe, securing a mould around the lesser diameter band, pumping polyurethane into the mould in a sufficient amount to form a field joint which extends into the second cut back and lies flush with the parent coating of the pipes to allow for reeling and laying of the pipe without snagging.

Whilst this method for forming a field joint has advantages in the reliability of the finished pipeline, a further advantage of this method of producing a field joint lies in the mechanical connection formed between the polyurethane infill and the parent coating of the pipes. As the polyurethane is pumped into the mould it pours into the recess in the lesser diameter band and when set forms an interference fit with the parent coating. This establishes a more secure field joint on the pipes and prevents shifting of the field joint once the pipe has been laid.

Preferably, the second cut back may also be angular.

Advantageously, the first and second cut backs are provided in the parent coating by either a grinding process or a lathing method.

Conveniently, the surface of the pipes is blasted in order to clean the surface, the surface of the pipes are then heated to a temperature between 70 and 90° C. and a primer is applied before the mould is secured around the field joint.

Advantageously, a thin coating of polyurethane may be applied over the first and second cut backs.

According to a further aspect of the present invention there is provided a field joint and located around the bare joint of two joined insulated pipes, the field joint comprising a polyurethane infill recessed into the insulated parent coating of the pipes such that the infill lies flush with the surface of the parent coating on the pipes.

Preferably, the field joint further comprises means for effecting a mechanical connection between the polyurethane infill and the parent coating.

Preferably, the mechanical connection is formed by a groove in the parent coating into which the polyurethane infill extends.

Advantageously, a plurality of grooves are provided in the parent coating to provide a series of mechanical connections between the parent coating and the polyurethane infill.

Alternatively, the mechanical connection is formed by a plurality of indentations in the parent coating into which the polyurethane infill extends.

One embodiment of the present invention will be described with reference to and as shown in the accompanying drawings in which.

Figure 1:
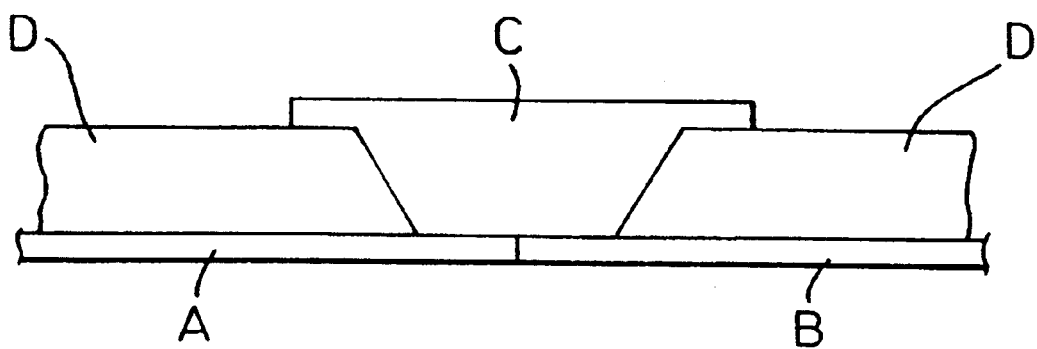
FIG. 1 shows a schematic view of a field joint according to the prior art.
Figure 2:
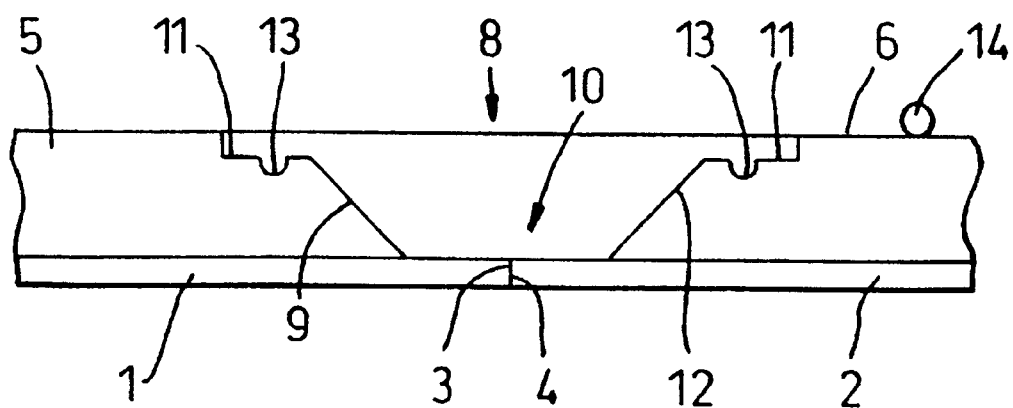
FIG. 2 shows a schematic view of a field joint according to one aspect of the present invention.

Referring to the drawings, FIG. 2 shows two pipe sections 1, 2 which it is intended to connect together to form a section of pipeline. The pipe sections are coated to within a short distance from the ends of the pipes 3, 4, generally to with 200 mm of the pipe ends. This parent coating 5 may comprise an inner anti-corrosion layer e.g. polyurethane or epoxy, a middle layer of foamed or solid polypropylene and an external protective layer of solid polypropylene of approximately 3–5 mm thick which is waterproof and abrasion resistant e.g. polyurethane or epoxy resin or rubber. The various layers of the parent coating have not been shown for ease of illustration.

The field joint 8 is initially bare. A first cut back is formed in the parent coating by a grinding process or lathing method. The resulting space between the coatings on the pipe ends has an inclined surface 9 which tapers away from the surface of the pipe 1, 2 to leave a substantially frusto-conical well 10 in the coating 5. A second cut back is made in the parent coating to provide a recessed annular band of parent coating of a lesser diameter than the parent coating on the rest of the pipe. The second cut back is made to a depth of approximately 5–10 mm from the upper surface of the parent coating.

A groove 13 is cut into the polyurethane covered recessed surface 11 around the circumference of the coated pipe. The groove 13 is substantially U-shaped in cross-section but may be V-shaped or of any other suitable configuration.

The tapered surfaces 9 and recessed surfaces 11 are washed with a cleaning solvent such as xylene.

As in accordance with known methods, the bare steel is then blasted and the angular ends and grooves abraded for example by using a grinder to provide a clean surface. An induction heating coil is now applied to the bare steel to raise the temperature of the steel to between 70 and 90° C. to receive the field joint and ensure that the field joint makes a good bond with the steel. A primer is now applied to the preheated steel.

It is possible to apply the primer to cold steel and then heat. However time is saved by applying the primer to the heated surface.

The tapered surfaces 9 and recessed surfaces 11 are then flame treated and may be covered with a thin layer of polyurethane 12. This may be applied by hand or alternatively by an automated process. The field joint area can then be flame treated.

An annular mould (not shown) is then secured around the parent coating of the adjacent pipes and a polyurethane filler is pumped into the annulus provided between the mould and the surface of the pipe. The mould having been preheated to a temperature of around 70° C. to assist with setting/curing the polyurethane.

As the polyurethane fills the mould, it also enters the groove 13 provided on the recessed surface 11 around the pipe and forms a mechanical bond between the field joint and the parent coating 5 of the pipe. As seen in FIG. 2, due to the recessed surface 11 of the parent coating adjacent the field joint, the field joint 8 is therefore recessed into the parent coating 5 rather than applied over the coating. This ensures that the upper surface of the field joint 8 is level with the upper surface of the parent coating 5 on the pipe. When the polyurethane has set, which generally takes less than 10 minutes generally between 5 to 7 minutes, the mould can be removed and the field joint checked to ensure that the surface of the field joint is level with that of the parent coating. Any inconsistencies can be removed at this time.

By applying a field joint as described above, the resulting pipe line can be reeled and laid without snagging the field joints upon the rollers used on a lay barge.

It will be understood that the polyurethane infill may also include an insulating material, weight material or an anti-corrosion material to retain the integrity of the field joint in use.

Figure 3:
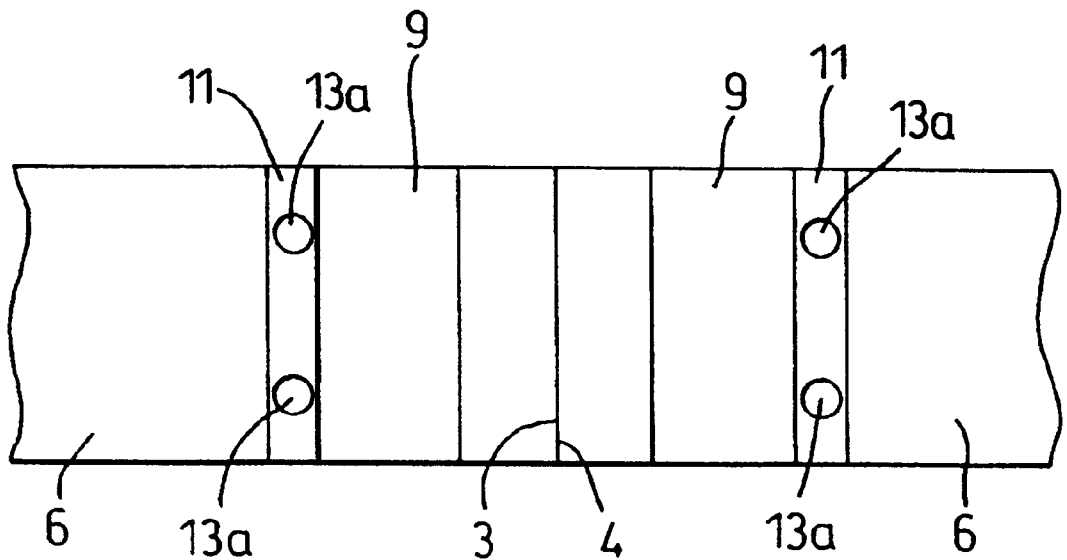
FIG. 3 is a plan view of an alternative field joint.

The groove described above provides a strong mechanical bond between the parent coating and the field joint and helps to retain the integrity of the field joint during use especially sub-sea. Although only one groove has been described, it will be understood that a plurality of grooves may be provided on the recessed section to form a plurality of mechanical bonds between the parent coating and the field joint. Alternatively, the groove or grooves may be replaced by a plurality of spaced indentations in the parent coating into which the polyurethane enters during the moulding process thereby providing several spaced mechanical bonds between the parent coating and the field joint. FIG. 3 shows a plan view of a field joint in accordance with this alternative form prior to the mould being placed over the field joint areas and the polyurethane pumped into the mould. The spaced indentations are shown as hemispherical however they can of course be of any suitable configuration.

The above described field joint and method of producing same can also be used to reduce the time taken for handling the pipeline off-shore. The steps of grinding the parent coating, flame treating the field joint area and applying the thin layer of polyurethane to the field joint area can be carried out on-shore either at the same time as the parent coating is applied or alternatively as a different facility where pipes coated with the parent coating can be stored ready for use. The prepared ends of the individual pipe sections can then be shrink wrapped with a sheet plastics material using a known process to retain the integrity of the field joint area.

In using such a technique, a nylon rope 14 is first applied around the outer surface of the parent coating slightly behind the recessed surface in the coating. The nylon rope prevents the shrinkwrap from sticking to the parent coating and enables the shrinkwrap to be peeled from the field joint area when the pipe section is required to be transported off-shore for use. The nylon rope also prevents the shrinkwrap surrounding one pipe end from sticking to the shrinkwrap of another pipe end should they come into contact with each other.

Once off shore, the shrink wrapping can be removed thus presenting a clean, pre-prepared field joint area, the nylon rope is removed from the pipes, the bare steel of the pipes can be blasted, primer applied, heat induction applied to the pipes, the mould secured and the polyurethane pumped into the mould to produce the field joint as described above.

Applying the above method, substantially reduces the overall time for processing the pipe line off-shore thus making the pipe laying process more cost effective. Furthermore, the amount of machinery which the lay barge is required to carry is also reduced giving more space on the barge for a greater number of pipe sections at any one time. It will also be apparent that as each of the pipe sections which are delivered to the barge will have a clean field joint area which can be checking prior to dispatch this will also reduce down time due to problems associated in preparing the field joint area prior to production of the field joint on the barge.

What is claimed is:

1. A method of forming a field joint around the bare joint of two joined insulation covered pipes comprising the steps of providing a first angular cut back in the parent coating to expose the end of a pipe, providing a second cut back in the parent coating to provide an annular band of the parent coating of a lesser diameter than the parent coating on the pipe, forming an indentation in the annular band, securing a mould around the annular band and said indentation, and pumping polyurethane into the mould in a sufficient amount to form a field joint which extends into said indentation and the second cut back and lies flush with the parent coating of the pipes to allow for reeling and laying of the pipe without snagging.

2. A method as claimed in claim 1, wherein the second cut back is angular.

3. A method as claimed in claim 1 or 2, wherein the first and second cut backs are provided in the parent coating by either a grinding process or a lathing method.

4. A method as claimed in claim 1, wherein a thin coating of polyurethane is applied over the first and second cut backs.

5. A method as claimed in claim 1, wherein the surface of the pipes is blasted in order to clean the surface, the surface of the pipes is then heated to a temperature between 70 and 90° C. and a primer is applied before the mould is secured around the field joint.

6. A method of forming a field joint around the bare joint of two joined insulation covered pipes comprising the steps of providing in each insulation covered pipe a first angular cut back in the parent insulation coating to expose the end of the pipe, providing a second cut back in the parent insulation coating to provide an annular band of the parent coating of a lesser diameter than the parent coating on the pipe, cutting a groove in the annular band, securing a mould around the annular band, and pumping polyurethane into the mould in a sufficient amount to form a field joint which extends into the second cut back and lies flush with the parent coating of the pipes to allow for reeling and laying of the pipe without snagging, wherein the polyurethane enters into the groove to form a mechanical bond between the polyurethane and the parent coating.

7. The method of claim 1 wherein said indentation includes a plurality of grooves.

* * * * *